US012415359B2

(12) United States Patent
Arakane et al.

(10) Patent No.: US 12,415,359 B2
(45) Date of Patent: Sep. 16, 2025

(54) LIQUID EJECTING APPARATUS AND CONTROLLING METHOD FOR THE SAME

(71) Applicant: BROTHER KOGYO KABUSHIKI KAISHA, Nagoya (JP)

(72) Inventors: Satoru Arakane, Nagoya (JP); Shotaro Iida, Nagoya (JP); Shin Hasegawa, Nagoya (JP); Yasuhiro Nakano, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/052,375

(22) Filed: Nov. 3, 2022

(65) Prior Publication Data

US 2023/0079132 A1 Mar. 16, 2023

Related U.S. Application Data

(63) Continuation of application No. 17/160,979, filed on Jan. 28, 2021, now Pat. No. 11,529,810.

(30) Foreign Application Priority Data

Jan. 31, 2020 (JP) ................................ 2020-014579

(51) Int. Cl.
*B41J 2/165* (2006.01)

(52) U.S. Cl.
CPC .................................. *B41J 2/1652* (2013.01)

(58) Field of Classification Search
None
See application file for complete search history.

(56) References Cited

U.S. PATENT DOCUMENTS 5,475,404 A 12/1995 Takahashi et al.
6,042,214 A * 3/2000 Minowa ................ B41J 2/1652 347/23

(Continued)

FOREIGN PATENT DOCUMENTS

JP H03234543 A 10/1991
JP H11138853 A 5/1999

(Continued)

OTHER PUBLICATIONS

Office Action dated Feb. 4, 2022 received in U.S. Appl. No. 17/160,979.

(Continued)

*Primary Examiner* — Alejandro Valencia
(74) *Attorney, Agent, or Firm* — Scully, Scott, Murphy & Presser, P.C.

(57) ABSTRACT

There is provided a liquid ejecting apparatus including: a head having a nozzle; a carriage; a receiver; and a controller. The controller is configured to execute: a first flushing processing; a second flushing processing including at least one of a discharge flushing driving and a non-discharge flushing driving of driving; and a printing processing. The first flushing processing is executed in a case that a first count value is not less than a first threshold value, the first count value being an elapsed time since a completion of the first flushing processing. The second flushing processing is executed in a case that a second count value is not less than a second threshold value, the second count value being an elapsed time since a completion of the printing processing.

13 Claims, 5 Drawing Sheets

(56) References Cited

U.S. PATENT DOCUMENTS

| | | | | |
|---|---|---|---|---|
| 6,109,724 | A | 8/2000 | Takahashi et al. | |
| 6,328,395 | B1 * | 12/2001 | Kitahara | B41J 2/04541 347/15 |
| 7,494,200 | B2 * | 2/2009 | Chikuma | B41J 2/1707 347/9 |
| 2002/0051022 | A1 * | 5/2002 | Hosono | B41J 2/04595 347/11 |
| 2004/0155915 | A1 * | 8/2004 | Kitami | B41J 2/04581 347/10 |
| 2008/0218549 | A1 | 9/2008 | Iriguchi | |
| 2014/0168299 | A1 * | 6/2014 | Kamibayashi | B41J 2/04556 347/10 |
| 2016/0067959 | A1 | 3/2016 | Zhang | |
| 2018/0029369 | A1 | 2/2018 | Arakane | |
| 2020/0311497 | A1 * | 10/2020 | Kondo | B41J 2/175 |

FOREIGN PATENT DOCUMENTS

| | | | |
|---|---|---|---|
| JP | 2005-212232 | A | 8/2005 |
| JP | 2008221482 | A | 9/2008 |
| JP | 2016055532 | A | 4/2016 |
| JP | 2018016018 | A | 2/2018 |

OTHER PUBLICATIONS

Office Action dated May 31, 2022 received in U.S. Appl. No. 17/160,979.

Notice of Allowance dated Aug. 16, 2022 received in U.S. Appl. No. 17/160,979.

Notice of Reasons for Refusal dated Nov. 7, 2023 received in Japanese Patent Application No. JP 2020-014579.

* cited by examiner

LIQUID EJECTING APPARATUS AND CONTROLLING METHOD FOR THE SAME

CROSS REFERENCE TO RELATED APPLICATION

The present application is a continuation application of U.S. application Ser. No. 17/160,979 filed on Jan. 28, 2021, which claims priority from Japanese Patent Application No. 2020-014579, filed on Jan. 31, 2020, the disclosure of which is incorporated herein by reference in its entirety.

BACKGROUND

The present disclosure relates to a liquid ejecting apparatus and a controlling method for the same.

As a conventional liquid ejecting apparatus, an ink-jet recording apparatus of Japanese Patent Application Laid-open No. 2005-212232 is known. In this ink-jet recording apparatus, in a case that a bidirectional printing is executed and that band-shaped image data is accumulated for two bands, then image formation is performed by moving a recording head from a stand-by position to a recording area. Thus, even in such a case that a transfer stand-by state, etc. is provided during the accumulation of the image data for the two bands, the recording head stands by at the outside of the recording area during the transfer stand-by state. Therefore, by executing a preliminary discharge during the transfer stand-by state, any increase in the viscosity of an ink in a nozzle is suppressed, thereby preventing any unsatisfactory ejection of the ink in the recording head.

SUMMARY

Note that although the above-described preliminary discharge is effective as means for suppressing the increase in the viscosity of the ink in the nozzle, it is necessary to move the recording head out of the recording area in order to perform the preliminary discharge. Therefore, a printing time becomes longer in a case that the number of time(s) of the preliminary discharge increases. On the other hand, although an ink having a shorter drying time has been used in the recent years in response to a demand for increasing the printing speed, the use of such an ink has a tendency of promoting any increase in the viscosity of the ink.

The present disclosure has been made in view of such a situation, and an object of the present disclosure is to provide a liquid ejecting apparatus and a controlling method therefor each of which is capable of realizing a high-speed printing while suppressing any unsatisfactory ejection due to the increase in the viscosity of the liquid.

According to an aspect of the present disclosure, there is provided a liquid ejecting apparatus including:

- a head having a nozzle configured to eject a liquid;
- a carriage configured to move reciprocally the head in a scanning direction;
- a receiver configured to receive the liquid discharged from the head in a flushing area; and
- a controller;
- wherein the controller is configured to execute:
  - a first flushing processing;
  - a second flushing processing including at least one of a discharge flushing driving of driving the head so as to cause the head to discharge the liquid to the receiver and a non-discharge flushing driving of driving the head so as to vibrate the liquid without discharging the liquid; and
  - a printing processing of driving the carriage and the head based on a print data such that the liquid is ejected in a printing area as the head is moved in the scanning direction;
- the first flushing processing is executed in a case that a first count value is not less than a first threshold value, the first count value being an elapsed time since a completion of the first flushing processing; and
- the second flushing processing is executed in a case that a second count value is not less than a second threshold value, the second count value being an elapsed time since a completion of the printing processing.

The present disclosure has the above-described configuration, and achieves an effect of providing a liquid ejecting apparatus and a controlling method therefor each of which is capable of realizing a high-speed printing while suppressing any unsatisfactory ejection due to the increase in the viscosity of the liquid.

The above-described object, other objects, features, and merits of the present disclosure will become apparent from the following detailed description of an embodiment as described below with reference to the accompanying drawings.

EMBODIMENTS

Figure 1:
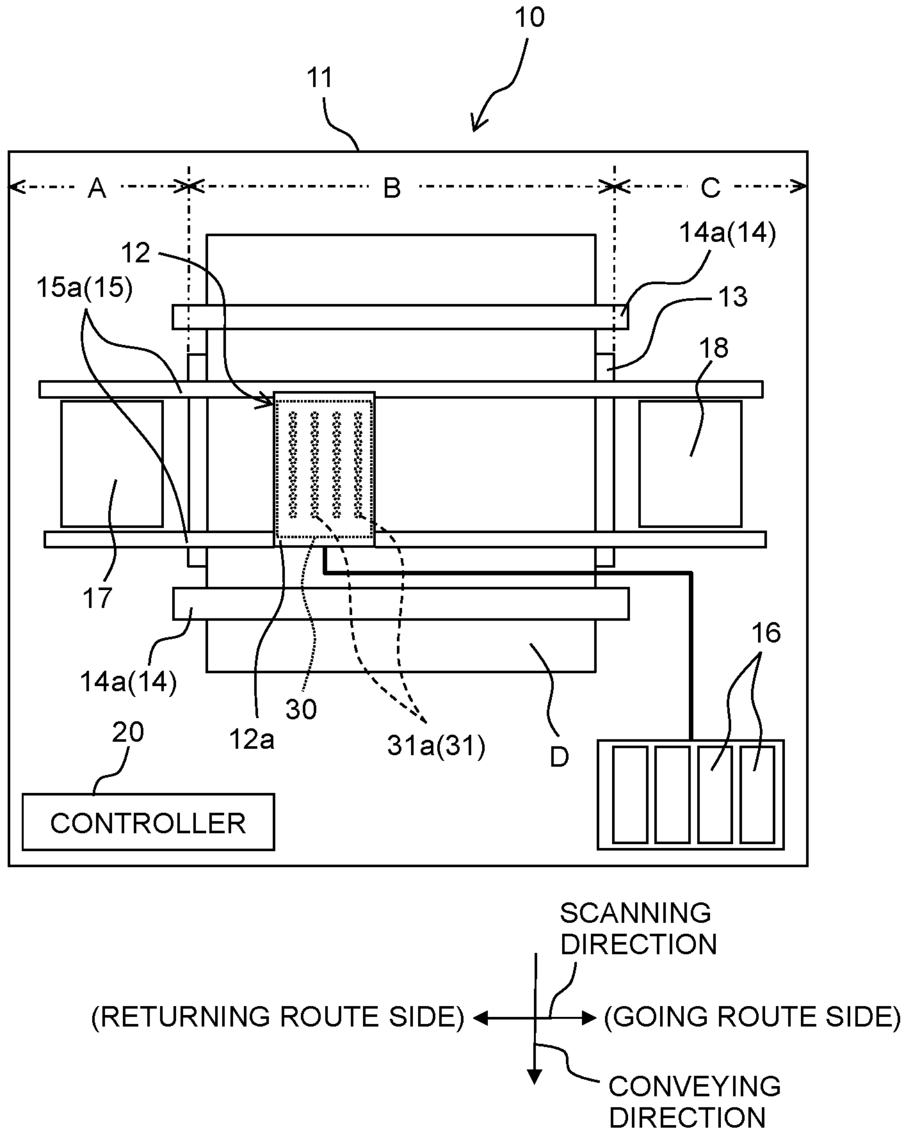
FIG. 1 is a schematic view of a liquid ejecting apparatus related to an embodiment of the present disclosure as viewed from thereabove.

In the following, an embodiment of the present disclosure will be specifically explained by referring to the drawings. Note that same or corresponding element through all the drawings in the following description are denoted by same reference numerals, and any overlapped explanation therefor will be omitted.

<Configuration of Image Recording Apparatus>

A liquid ejecting apparatus 10 related to an embodiment of the present disclosure is an apparatus which ejects (discharges) a liquid such an ink, as depicted in FIG. 1; the liquid ejecting apparatus 10 is, for example, an ink-jet printer. The liquid ejecting apparatus 10 adopts a serial head system and includes: a casing 11, a head unit 12, a platen 13, a conveying mechanism 14, a scanning mechanism (scanner) 15, a storing tank 16, a receiving part (receiver) 17, a maintenance unit 18 and a controller 20.

The casing 11 accommodates the respective parts of the liquid ejecting apparatus 10 therein. In the casing 11, a flushing area A, a printing area B and a maintenance area C are provided in a scanning direction. The flushing area A is arranged on one side in the scanning direction with respect to the printing area B, and the maintenance area C is arranged on the other side in the scanning direction with respect to the printing area B. The printing area B is adjacent to the respective areas that are the flushing area A and the maintenance area C in the scanning direction, and is arranged between the flushing area A and the maintenance area C. Note that in the scanning direction, a side from the flushing area A toward the maintenance area C is referred to as a side of a going route (going route side), and a side opposite to the going route side is referred to as a side of a returning route (returning route side). Further, a conveying direction is a direction crossing (e.g., orthogonal to) the scanning direction.

The head unit 12 has a carriage 12*a* and a head 30. The head 30 is mounted on the carriage 12*a* and moves reciprocally in the scanning direction together with the carriage 12*a*.

Figure 2:
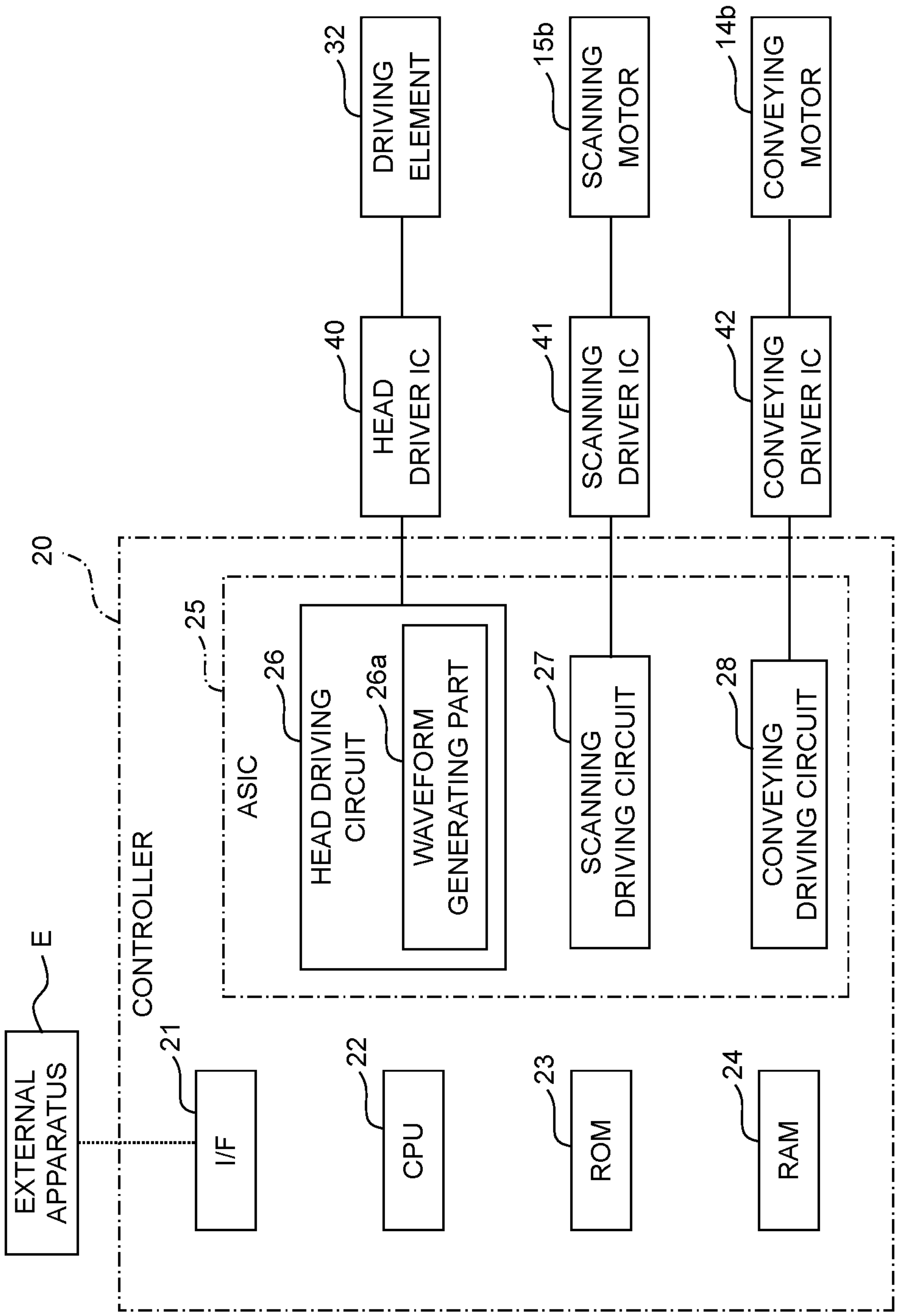
FIG. 2 is a functional block diagram indicating the configuration of the liquid ejecting apparatus of FIG. 1.

The head 30 has a channel forming body and a driving element 32 (FIG. 2). In the channel forming body, a liquid channel is formed inside thereof, and a plurality of nozzles 31 of the liquid channel are opened in a lower surface (ejection surface or discharge surface) of the channel forming body. The plurality of nozzles 31 are aligned in the conveying direction so as to form a plurality of nozzle rows (e.g., four nozzle rows). As the driving element 32, a piezoelectric element, a heating element which heats a liquid, etc., is used. In a case that the driving element 32 is driven and that a volume of the liquid channel is changed so as to cause the meniscus of an opening (a nozzle hole 31*a*) of each of the plurality of nozzles 31 to finely vibrate, thereby ejecting (discharging) a drop (liquid droplet) of the liquid therefrom. As a result, an image is recorded on a recording medium D. That is, the head 30 has the plurality of nozzles 31 via which the liquid is ejected (discharged).

The platen 13 is arranged in the printing area B; the platen 13 is a flat plate-shaped member, and the recording medium D is arranged on the upper surface of the platen 13. The platen 13 determines a distance between the recording medium D and the ejection surface of the head 30 which is arranged to face (to be opposite to) the recording medium D. Note that although the side of the head 30 with respect to the platen 13 is referred to as the upper side, and the side opposite to this side is referred to as the lower side, the arrangement of the liquid ejecting apparatus 10 is not limited to or restricted by this.

The conveying mechanism 14 includes, for example, two conveying rollers 14*a* and a conveying motor 14*b* (FIG. 2). The two conveying rollers 14*a* sandwich the platen 13 therebetween in the conveying direction and are arranged parallel to each other such that the rotation axes thereof extend in the scanning direction. The two conveying rollers 14*a* are connected to the conveying motor 14*b* and are rotated in a case that the conveying motor 14*b* is driven, thereby conveying the recording medium D on the platen 13 in the conveying direction.

The scanning mechanism 15 is a mechanism which causes the head 30 to move reciprocally in the scanning direction, and includes, for example, two guide rails 15*a*, a scanning motor 15*b* (FIG. 2), an endless belt, etc. The carriage 12*a* of the head unit 12 is supported by the two guide rails 15*a* and is fixed to the endless belt. In a case that the scanning motor 15*b* is driven, the endless belt connected to the scanning motor 15*b* runs. This causes the carriage 12*a* to move reciprocally in the scanning direction within a predetermined scanning range, along the two guide rails 15*a*. The two guide rails 15*a* extend to span across an area between the flushing area A and maintenance area C, and the head 30 is movable between the flushing area A and the maintenance area C via the printing area B.

The storing tank 16 is, for example, a detachable cartridge, and is provided on each type of the liquid. For example, there are four pieces of the storing tank 16 and store black, yellow, cyan and magenta liquids, respectively. The respective four storing tanks 16 are connected to the liquid channel of the head 30; each of the four storing tanks 16 supplies one of the liquids to nozzles 31 of a nozzle row corresponding thereto.

The receiving part (receiver) 17 is arranged in the flushing area A; the receiving part 17 is, for example, a rectangular-parallelepiped shaped container having a recessed part and opened toward the upper side. This opening faces the ejection surface of the head 30 which is arranged in the flushing area A, and the receiving part 17 receives the liquid discharged from the head 30 in the flushing area A. The recessed part may be provided with an absorbing body which absorbs the liquid.

The maintenance unit 18 is arranged in the maintenance area C and has a cap which performs maintenance of the head 30, etc. The cap has, for example, a rectangular parallelepiped shape having a recessed part and opened toward the upper side. The opening faces the ejection surface of the head 30 which is arranged in the maintenance area C, and is capable of approaching to or retreating from the ejection surface. For this reason, the cap moves closely to the ejection surface and covers the ejection surface, and is capable of preventing the liquid from drying in the nozzle hole 31*a* of the ejection surface. Further, the cap is separated away from the ejection surface and exposes the ejection surface, and allows the liquid to be ejected from the nozzle hole 31*a* to perform the printing.

<Configuration of Controller>

As depicted in FIG. 2, the controller 20 has an interface (I/F) 21, a CPU 22, a ROM 23, a RAM 24 and an ASIC (Application Specific Integrated Circuit) 25. The I/F 21 receives various kinds of data, such as print data, etc., from an external apparatus E such as a computer, a camera, a network, a recording medium, etc. The print data includes data indicating an image to be recorded on the recording medium, and data indicating a condition for forming (printing) an image.

The RAM 24 temporarily stores the various kinds of data. The various kinds of data are exemplified by the print data and data converted by the controller 20. The ROM 23 stores a computer program and a control program for executing various kinds of data processing. Note that the computer program may be obtained from the external apparatus E via the I/F 21, or may be stored in another recording medium.

The ASIC 25 has respective driving circuits 26 to 28 each of which drives one of the respective parts, and is electrically connected to a head driver IC 40, a scanning driver IC 41 and a conveying driver IC 42. The CPU 22 executes the computer program stored in the ROM 23 to thereby cause at least one of the CPU 22 and the ASIC 25 to control the head 30, the conveying motor 14*b* and the scanning motor 15*b* so as to perform the variety of kinds of processing. For example, the controller 20 executes a first flushing processing, a second flushing processing and a printing processing. These processings will be described later on.

The head driving circuit 26 has a waveform generating part 26*a*. The waveform generating part 26*a* generates respective waveform signals each of which defines a waveform of a driving signal to be outputted to the driving element 32. The waveform signals include a waveform signal for printing (printing waveform signal), a waveform signal for discharge flushing (discharge flushing waveform signal) and a waveform signal for non-discharge flushing (non-discharge flushing waveform signal). The head driving circuit 26 selects, for example, one kind of waveform signal from the three kinds of waveform signals for each of the plurality of nozzles 31, in accordance with the first and second flushing processings and the printing processing, and generates selection data. Note that the printing waveform signal includes a plurality of waveform signals in which amounts of the liquid to be ejected are mutually different. Therefore, in a case that the head driving circuit 26 selects the printing waveform signal, the head driving circuit 26 selects one kind of printing waveform signal from the plurality of kinds of printing waveform signals in accordance with the amount of the liquid for each drop based on the print data.

The head driving circuit 26 is connected to the head driver IC 40, and the head driver IC 40 is connected to the driving element 32. With this, the head driving circuit 26 controls the driving element 32 by the head driver IC 40. The head driving circuit 26 outputs the waveform signal and the selection data thereof to the head driver IC 40. Note that in the printing processing, the controller 20 converts the print data into data for printing such as raster data, and generates and outputs the selection data for each of the plurality of nozzles 31 and at each ejection period, based on this data.

The head driver IC 40 converts the waveform signal and the selection data into a driving signal for the driving element 32, and outputs the driving signal to the driving element 32. With this, the driving element 32 is driven to thereby change the volume of the pressure chamber of the liquid channel, which in turn applies a pressure to the liquid in the pressure chamber. As a result, the meniscus of the nozzle hole 31*a* communicating with the pressure chamber is finely vibrated by a non-discharge flushing driving signal based on the non-discharge flushing waveform signal. Further, a liquid droplet of a predetermined amount is discharged from the nozzle hole 31*a* by a discharge flushing driving signal based on the discharge flushing waveform signal. Furthermore, a liquid droplet of an amount corresponding to the print data is ejected from the nozzle hole 31*a*, by a printing driving signal based on the printing waveform signal.

The scanning driving circuit 27 outputs control data corresponding to each of the respective processings to the scanning driver IC 41. The scanning driver IC 41 outputs a driving signal according to the control data to the scanning motor 15*b*, and controls the driving of the scanning motor 15*b*. Further, the conveying driving circuit 28 outputs control data corresponding to each of the respective processings to the conveying driver IC 42. The conveying driver IC 42 outputs a driving signal corresponding to the control data to the conveying motor 14*b* so as to control the driving of the conveying motor 14*b*. With this, the driving timing, speed of rotation, amount of rotation, etc., of each of the scanning motor 15*b* and the conveying motor 14*b* are controlled.

<First Flushing Processing, Second Flushing Processing and Printing Processing>

The controller 20 executes the first flushing processing, the second flushing processing and the printing processing. The first flushing processing includes discharge flushing driving, and the second flushing processing includes at least one of the discharge flushing driving and the non-discharge flushing driving.

In the discharge flushing driving, the controller 20 drives the head 30 so as to cause the head 30 to discharge the liquid to the receiving part 17. Here, the controller 20 controls the scanning motor 15*b* so as to move the head 30 in the scanning direction until the head 30 reaches the position above the receiving part 17 so that the ejection surface of the head 30 faces the upper opening of the receiving part 17. Further, the controller 20 controls the driving element 32 by the discharge flushing driving signal so as to discharge a predetermined amount of the liquid from the nozzle(s) 31. The discharged liquid is accommodated in the receiving part 17. As described above, since the liquid is discharged from the nozzle(s) 31, it is possible to suppress any increase in the viscosity of the liquid in the nozzle(s) 31.

In the non-discharge flushing driving, the controller 20 drives the head 30 so as to cause the liquid to finely vibrate without being discharged. Here, the controller 20 controls the driving element 32 by the non-discharge flushing driving signal, and applies the pressure to the liquid to finely vibrate the meniscus of the nozzle(s) 31 so as not to discharge the liquid from the nozzle(s) 31. Thus, the liquid in the nozzle(s) 31 is stirred or agitated, thereby making it possible to lower the viscosity (increased viscosity) of the liquid.

In the printing processing, the controller 20 drives the scanning mechanism 15 and the head 30, based on the print data, so as to eject the liquid in the printing area B while moving the head 30 in the scanning direction. Here, the controller 20 controls the scanning motor 15*b* so as to move the head 30 in the scanning direction in the printing area B. Further, the controller 20 controls the driving element 32 by the printing driving signal so as to eject an amount, of the liquid, corresponding to the print data from the nozzle(s) 31. The ejected liquid forms a dot (an image) on the recording medium D arranged in the printing area B.

Thus, the printing processing includes a scanning operation and a liquid ejecting operation. The printing processing and a conveying operation of conveying the recording medium D in the conveying direction by a predetermined amount are alternately repeated as one pass, thereby advancing the printing. The printing is a bidirectional printing in which the printing processing is performed when the head 30 is moved to each of one side and the other side in the scanning direction.

For example, the printing is executed for each print data (each of a plurality of pieces of the print data) of a predetermined amount (e.g., an amount corresponding to one pass). In this case, the head 30 ejects the liquid, based on the print data, while moving in the printing area B toward one side of the going route side and the returning route side in the scanning direction. As a result, dots are formed in the scanning direction by the liquid ejected for each of the plurality of pieces of the print data, and an image (pass image) is formed on the recording medium D. Subsequently, by the conveying operation, the recording medium D is moved in the conveying direction relative to the head 30. By alternately repeating this, a plurality of pieces of the pass image are arranged side by side in the conveying direction to thereby form an image corresponding to the print data.

<Controlling Method of Liquid Ejecting Apparatus>

For example, before the printing is started, the head 30 is arranged in the maintenance area C and the ejection surface is covered by the cap of the maintenance unit 18. This prevents the liquid in each of the plurality of nozzles 31 which are opened in the ejection surface from being dried.

In a case that the controller 20 obtains the print data, the controller 20 starts the printing. Accordingly, before the controller 20 starts the printing, the controller 20 removes the cap from the head 30 to expose the ejection surface. Then, the controller 20 moves the head 30 from the maintenance area C to the flushing area A in the conveying direction toward the returning route side. In this flushing area A, the controller 20 executes the first flushing processing. Note that, in this situation, although the printing is executed after the cap is removed and then the first flushing processing is executed, it is allowable to execute the printing after the cap is removed, without executing the first flushing processing.

In the printing, the controller 20 stores, in the RAM 24, a predetermined amount (e.g., the amount corresponding to one pass) of the print data and executes the printing processing based on the print data. In the printing processing, the controller 20 causes the driving element 32 to execute the liquid ejecting operation for each of a plurality of pieces of the print data, and causes the liquid to be ejected from the nozzles 31. Further, according to the stored print data of one pass, the controller 20 causes the head 30 to eject the liquid while causing the head 30 to move in the printing area B toward one side among the going route side and the returning route side in the scanning direction, to thereby form the pass image on the recording medium D. While executing the printing processing, the controller 20 executes the first flushing processing as depicted in FIG. 3A and the second flushing processing as depicted in FIG. 3B.

Figure 3A:
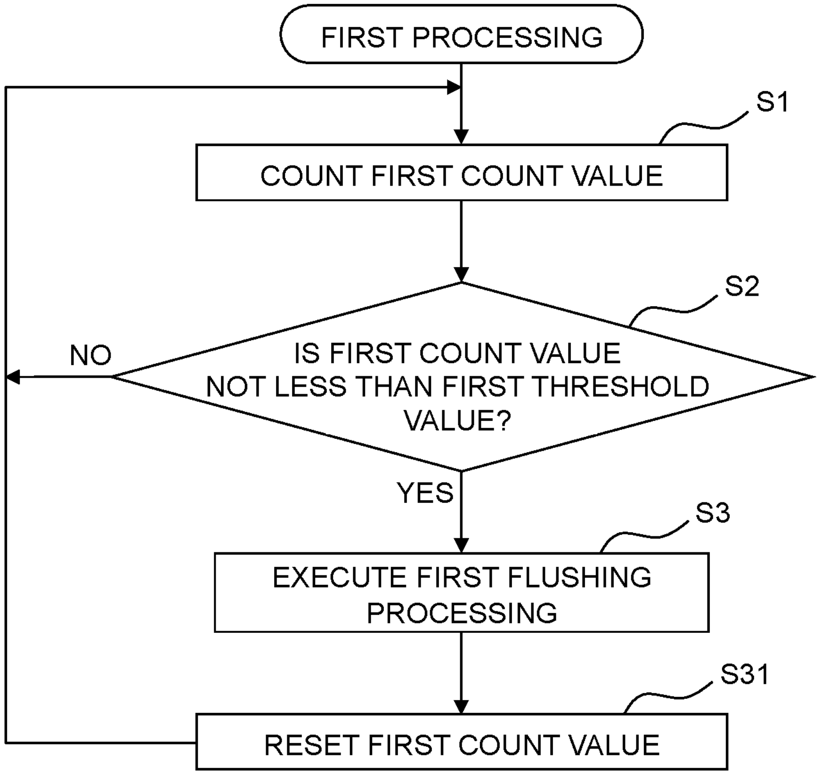
FIG. 3A and FIG. 3B are each a flow chart indicating an example of a controlling method for the liquid ejecting apparatus of FIG. 1.

Specifically, as depicted in FIG. 3A, the controller 20 executes the discharge flushing driving of the first flushing processing, then the controller 20 counts, as a first count value, an elapsed time elapsed since the execution of the flushing driving and the completion of the first flushing processing (step S1). Subsequently, the controller 20 determines whether or not the first count value is not less than a first threshold value (step S2). The first threshold value is determined previously by a simulation, an experiment, etc., based on the property of the liquid, the amount of the liquid to be ejected by the printing processing, etc., and is, for example, 60 seconds. Note that, in a case that the printing is performed without executing the first flushing processing after the cap has been removed at a time of starting the printing, it is allowable to count the first count value as an elapsed time elapsed from a point of time when the cap has been removed.

In a case that the first count value is less than the first threshold value (step S2: NO), the controller 20 returns to the processing of step S1, and continues the counting of the first count value. On the other hand, in a case that the first count value is not less than the first threshold value (step S2: YES), the controller 20 moves the head 30 to the flushing area A and executes the first flushing processing (step S3). Then, the controller 20 resets the first count value (step S31), and starts the counting of the first count value (step S1) again.

Figure 3B:
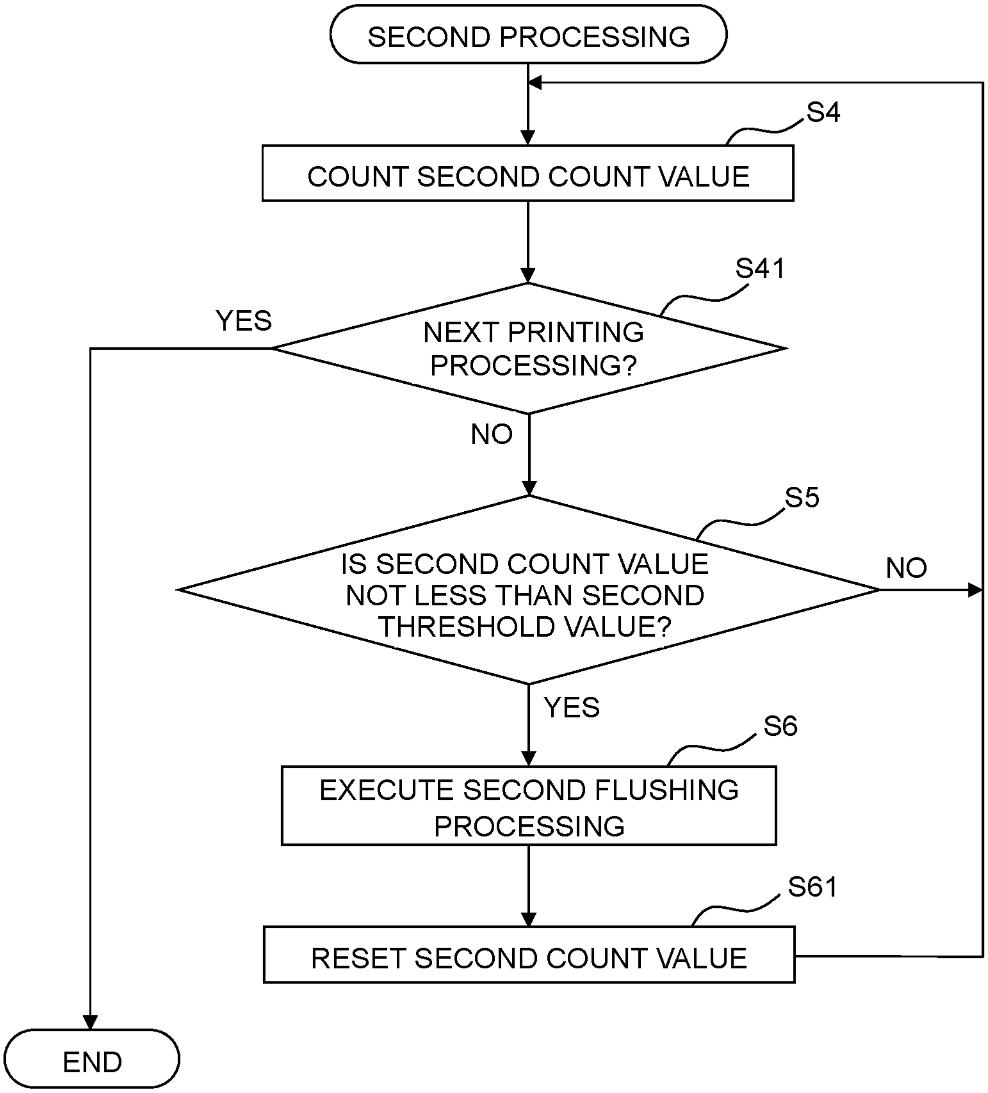

Further, as depicted in FIG. 3B, the controller 20 execute the liquid ejecting operation for each of the plurality of pieces of the print data in the printing processing, and eject the amount, of the liquid, corresponding to the print data from the nozzles 31. The controller 20 executes the liquid ejecting operation so as to perform the printing processing, and then the controller 20 counts, as a second count value, an elapsed time elapsed since the completion of the printing processing (step S4); in a case that next printing processing is not started (step S41: NO), the controller 20 determines whether or not the second count value is not less than a second threshold value (step S5). The second threshold value is determined previously by a simulation, an experiment, etc., based on a moving speed of the head 30, an ejection frequency of the liquid, etc., and is, for example, 6 seconds. In a case that next printing processing is started (step S41: YES), the controller 20 ends the processing.

Here, in a case that such a state is provided wherein the print data can be continuously obtained by the controller 20 without any interruption, the controller 20 obtains next print data during a period (time period) which is less (shorter) than the second threshold value since a previous liquid ejecting operation (completion of the printing processing), and the controller 20 is capable of executing a next liquid ejecting operation (next printing processing) based on the obtained print data for the next liquid ejecting operation. Therefore, the second count value will be less than second threshold value (step S5: NO), the controller 20 returns to the processing of step S4, and continues the counting of the second count value. In other words, the next printing processing is executed before the second count value reaches not less than the second threshold value in step S5.

On the other hand, for example, in a case that the controller 20 cannot obtain the print data due to a failure in the wireless communication, etc., the liquid ejecting operation based on the print data is interrupted, and the second count value reaches not less than the second threshold value (step S5: YES). In such a case, a state that the liquid is not ejected from the nozzles 31 is continued, and the liquid exposed in the nozzle holes 31*a* is dried, which in turn increases the viscosity of the liquid in the nozzles 31. In order to suppress the occurrence of such an increase in the viscosity, the controller 20 executes the second flushing processing (Step S6). Then, the controller 20 resets the second count value (step S61), and starts the counting of the second count value (step S4) again.

Here, in a case that the discharge flushing driving is executed as the second flushing processing, the controller 20 moves the head 30 to the flushing area A and causes the liquid to be discharged from the head 30. Further, in a case that the non-discharge flushing driving is executed as the second flushing processing, the controller 20 causes the liquid to finely vibrate so as not to be discharged the from the head 30, when the controller 20 determines that the second count value is not less than the second threshold value.

In this manner, in the case that the first count value, which is the elapsed time elapsed since the completion of the first flushing processing, is not less than the first threshold value, the controller 20 executes the first flushing processing. Further, in the case that the second count value, which is the elapsed time elapsed since the completion of the printing processing and until the starting of the next printing processing, is not less than the second threshold value, the controller 20 executes the second flushing processing. The second count value is counted during a period of time in which a liquid ejecting processing for the printing processing is not performed, and is not counted during a period of time in which the liquid ejecting processing for the printing processing is performed.

According to this, the ejection of the liquid by the printing processing is regarded as a kind of the discharge flushing, and it is possible to set the first threshold value, which is set on the premise that the printing processing is continuously executed, to be longer. As a result, it is possible to reduce the number of time(s) and the time (duration of time) of the first flushing processing, and to realize a high-speed printing.

Further, in a case that the printing processing is interrupted and that the second count value is not less than the second threshold value, the second flushing processing is executed. As a result, it is possible to reduce any increase in the viscosity of the liquid in the nozzles 31, thereby making it possible to suppress the occurrence of any unsatisfactory ejection caused due to the increase in the viscosity.

Further, the first threshold value is greater than the second threshold value. Therefore, since an interval between the first flushing processings becomes long, it is possible to realize a high-speed printing. In addition, the liquid is ejected by the printing processing in the interval between the first flushing processings, thereby making it possible to suppress any unsatisfactory ejection due to the increase in the viscosity of the liquid.

Note that the determination in each of step S2 and step S5 may be executed every time the printing processing based on the print data corresponding to one pass is completed. Alternatively, the determination may be executed after the print data corresponding to a next one pass is obtained and before the start of the printing processing for the next pass. The printing processing by such a print data corresponding to the one pass is completed or finished in a case that the head 30 is located at an end (end part) of the printing area B, or is located in the flushing area A or in the maintenance area C, and the printing processing of the next pass is started from here. Thus, the determination is made in a case that the head 30 is stopped at the end part of the print area B, or in the flushing area A or in the maintenance area C.

Note, however, that the timing of the determination is not limited to this. The determination may be executed always during the printing. Alternatively, the determination may be executed every time the head 30 is positioned in (at) the flushing area A. In such a situation, in a case that the controller 20 determines that the first count value is not less than the first threshold value, it is possible to execute the discharge flushing driving, without moving the head 30 to the flushing area A.

Note that the first flushing processing may include non-discharge flushing driving in addition to or instead of the discharge flushing. That is, the first flushing processing may include at least one of the discharge flushing and the non-discharge flushing.

<First Modification>

In a liquid ejecting apparatus 10 according to a first modification, in a case that the first count value is not less than the first threshold value and that the controller 20 executes the first flushing processing, the controller 20 resets the first count value and the second count value; on the other hand, in a case that the second count value is not less than the second threshold value and that the controller 20 executes the second flushing processing, the controller 20 resets the second count value without resetting the first count value. That is, the controller resets the first count value and the second count value in a case that the first flushing processing has been executed, and reset the second count value without resetting the first count value in a case that the second flushing processing has been executed.

For example, in the flow chart of FIG. 3A, in a case that the first count value is not less than the first threshold value (step S2: YES), the controller 20 executes the first flushing processing (step S3). Then, the controller 20 resets the first count value and the second count value, and then returns to step 51 and to step S4 of FIG. 3B, and counts the each of the first and second count values.

The discharge flushing driving is executed by this first flushing processing, and the liquid is discharged from the nozzles 31. Therefore, any increase in the viscosity of the liquid in the nozzles 31 is reduced, and there is provided a state that the printing can be executed. Therefore, not only the first count value is reset, but also the second count value is reset. As a result, the second count value does not reach the second threshold value immediately after the first flushing processing, and any wasteful (unnecessary) execution of the second flushing processing can be reduced.

Further, in the flow chart of FIG. 3B, in a case that the second count value is not less than the second threshold value (step S5: YES), the controller 20 executes the second flushing processing (step S6). The controller 20 then resets the second count value and returns to step S4, without resetting the first count value, and counts the second count value.

For example, in a case that the non-discharge flushing driving is executed in the second flushing processing, although the liquid in the nozzles 31 is agitated or stirred to thereby reduce the viscosity (increased viscosity) of the liquid, a reduction amount of the viscosity of the liquid in the non-discharge flushing driving is smaller than that in the discharge flushing driving. Therefore, by continuing the counting of the elapsed time elapsed since the completion of the first flushing processing, the discharge flushing driving of the first flushing processing can be executed at an appropriate timing, thereby making it possible to maintain the viscosity of the liquid to be low.

Note that the first flushing processing may include non-discharge flushing driving in addition to or instead of the discharge flushing. That is, the first flushing processing may include at least one of the discharge flushing and the non-discharge flushing.

<Second Modification>

In a liquid ejecting apparatus 10 according to a second modification, at least one of an amount of the liquid to be discharged in the discharge flushing driving and a number of times of the discharging of the liquid to be performed in the discharge flushing is greater in the case of the second flushing processing than that (those) in the case of the first flushing processing. Note that the second flushing processing includes the discharge flushing driving, and may further include the non-discharge flushing driving in addition to the discharge flushing driving.

Specifically, in one time of the discharge flushing driving, the liquid is discharged from the nozzles 31 one time or a plurality of times. The number of time(s) of this operation of discharging the liquid (liquid discharging operation) may be greater in the second flushing processing than that in the first flushing processing. As a result, the liquid discharging operation is executed in the discharge flushing driving of the second flushing processing by a number of time(s) which is greater than that in the discharge flushing driving of the first flushing processing.

In addition, the amount of the liquid discharged from each of the nozzles 31 in one time of the discharge flushing driving in the second flushing processing may be greater than that in the first flushing processing. In such a case, the amount of the liquid discharged in one time of the liquid discharging operation may be greater in the second flushing processing than that in the first flushing processing. In a case that the liquid discharging operation is executed a plurality of times in one time of the discharge flushing driving, a total amount of the liquid discharged from each of the nozzles 31 in the plurality of times of the liquid discharging operation may be greater in the second flushing processing than that in the first flushing processing.

The printing processing is continuously executed prior to such a first flushing processing, and the liquid is ejected from the nozzles 31 by the printing processing. In contrast, the liquid is not ejected from the nozzles 31 prior to the second flushing processing during a time period corresponding to not less than the second threshold value and thus the viscosity of the liquid is higher than that in a state before the first flushing processing. Therefore, by increasing the discharge amount and/or the discharge number of time(s) in the second flushing processing to be greater than that (those) in the first flushing processing, it is possible to maintain the viscosity of the liquid to be low.

<Third Modification>

In a liquid ejecting apparatus 10 according to a third modification, in a case that the first count value is not less than the first threshold value and that the second count value is not less than the second threshold value, the controller 20 executes the second flushing processing without executing the first flushing processing.

For example, the controller 20 executes the discharge flushing driving in the second flushing processing. Note that in the second flushing processing, it is allowable to execute the non-discharge flushing driving in addition to the discharge flushing driving. The discharge amount of the liquid and/or the discharge number of time(s) in the second flushing processing is greater than that (those) in the first flushing processing. In this case, the viscosity (increased viscosity) of the liquid in the nozzles 31 is further reduced by the second flushing processing than by the first flushing processing. As a result, a printable state in which the printing is executable is provided without executing the first flushing processing, thereby making it possible to reduce any wasteful or unnecessary execution of the first flushing processing.

<Fourth Modification>

In a liquid ejecting apparatus 10 according to a fourth modification, the first flushing processing includes the non-discharge flushing driving. In a case that the first count value reaches the first threshold value, the controller 20 executes the non-discharge flushing driving in the first flushing processing.

Specifically, the controller 20 executes the determination as to whether or not the first count value is not less than the first threshold value always during the printing. The first flushing processing includes the discharge flushing driving and the non-discharge flushing driving. Since there is no limitation regarding a place or location at which the non-discharge flushing is executed, the controller 20 executes the non-discharge flushing driving in a case that the first count value reaches the first threshold value. Further, since the discharge flushing driving is executed in the flushing area A, after the controller 20 has executed the non-discharge flushing driving and in a case that the first count value exceeds the first threshold value (specifically, for example, after the head 30, which has been moving while executing the non-discharge flushing reaches the flushing area A), the controller 20 executes the discharge flushing. Furthermore, in a case that the discharge flushing driving is executed, the controller 20 resets the first count value and then counts, as the first count value, an elapsed time elapsed since (the execution of) the discharge flushing driving.

In this manner, even in a case that the head 30 is positioned at a location different from the flushing area A, such as the printing area B or the maintenance area C, the controller 20 can execute the non-discharge flushing driving of the first flushing processing at an appropriate timing. By such a non-discharge flushing driving, it is possible to suppress the increase in the viscosity of the liquid in the nozzles 31. Further, the controller 20 can reduce the viscosity (increased viscosity) of the liquid in the nozzles 31 by executing the discharge flushing driving.

<Fifth Modification>

In a liquid ejecting apparatus 10 according to a fifth modification, in a case that the second count value reaches the second threshold value, the controller 20 executes the non-discharge flushing driving in the second flushing processing.

Specifically, the second flushing processing includes the non-discharge flushing driving. The controller 20 executes the determination as to whether or not the second count value is not less than the second threshold value always during the printing. Since there is no limitation regarding a place or location at which the non-discharge flushing is executed, the controller 20 executes the non-discharge flushing driving in a case that the second count value reaches the second threshold value.

In this manner, even in a case that the head 30 is positioned at a location different from the flushing area A, such as the printing area B or the maintenance area C, the controller 20 can execute the non-discharge flushing driving of the second flushing processing at an appropriate timing. By such a non-discharge flushing driving, it is possible to maintain the liquid viscosity of the liquid in the nozzles 31 to be low.

Note that the second flushing processing may include the discharge flushing driving, in addition to the non-discharge flushing driving. In this case, the discharge flushing driving is executed after the non-discharge flushing driving has been executed and after the second count value exceeds the second threshold value (specifically, for example, after the head 30, which has been moving while executing the non-discharge flushing reaches the flushing area A). Thus, the liquid is removed from the nozzles 31, thereby making it possible to reduce the viscosity (increased viscosity) of the liquid in the nozzles 31.

Further, after the controller 20 executes the second flushing processing, the controller 20 resets the second count value, and then counts, as the second count value, the elapsed time elapsed since the completion of the discharge flushing driving.

<Sixth Modification>

In a liquid ejecting apparatus 10 according to a sixth modification, each of the first flushing processing and the second flushing processing includes the discharge flushing driving and the non-discharge flushing driving. In a print image-priority mode in which print image quality is prioritized over print efficiency, the controller 20 executes the discharge flushing driving and the non-discharge flushing driving in each of the first flushing processing and the second flushing processing. In a print efficiency-priority mode in which the print efficiency is prioritized over the print image quality, the controller 20 executes the discharge flushing driving or the non-discharge flushing driving in the second flushing processing.

Specifically, the print data includes a first command executing the printing in the print image quality-priority mode, and a second command executing the printing in the print efficiency-priority mode. The print efficiency-priority mode is a mode in which the print efficiency, which is at least one of a speed of performing the printing on the recording medium D and an amount of the liquid to be ejected (liquid ejection amount) from the nozzles 31 so as to form an image on the recording medium D, is prioritized over a quality of the image (image quality) to be recorded on the print medium D. The print image quality-priority mode is a mode in which the image quality is prioritized over the print efficiency. Therefore, the image quality in the print image quality-priority mode is higher than that in the print efficiency-priority mode. The printing speed in the print efficiency-priority mode is faster than that in the print image quality-priority mode, and the liquid ejection amount in the printing efficiency-priority mode is smaller than that in the print image quality-priority mode.

The controller 20 obtains print data and determines whether the print data includes the first command or the second command. In a case that the print data includes the first command, the controller 20 executes the printing processing based on the print data and in the print image quality-priority mode. Here, the controller 20 executes the first flushing processing in a case that the first count value is not less than the first threshold value; on the other hand, the controller 20 executes the second flushing processing in a case that the second count value is not less than the second threshold value. Both the discharge flushing driving and the non-discharge flushing driving are executed in either one of the first flushing processing and the second flushing processing. In this case, it is allowable that the controller 20 executes the non-discharge flushing driving in a case that each of the first and second count values reaches the threshold value thereof, and that after the controller 20 has executed the non-discharge flushing driving, the controller 20 moves the head 30 to the flushing area A, and then the controller 20 executes the discharge flushing driving.

On the other hand, in a case that the print data includes the second command, the controller 20 executes the printing processing based on the print data and in the print efficiency-priority mode. Here, the controller 20 executes the first flushing processing in a case that the first count value is not less than the first threshold value; on the other hand, the controller 20 executes the second flushing processing in a case that the second count value is not less than the second threshold value. In this second flushing processing, the controller 20 executes either one of the discharge flushing driving and the non-discharge flushing driving.

As described above, in the print efficiency-priority mode, by executing either one of the non-discharge flushing driving and the discharge flushing driving, it is possible to reduce a driving power and to improve the print efficiency while reducing the viscosity (increased viscosity) of the liquid. In contrast, in the print image quality-priority mode, by executing the non-discharge flushing driving and the discharge flushing driving, it is possible to further reduce the viscosity of the liquid in the nozzles 31, to suppress the occurrence of any unsatisfactory ejection due to the increase in the viscosity, and to execute the printing in high image quality.

Further, in the second flushing processing, the non-discharge flushing driving may be executed without executing the discharge flushing driving. As a result, it is not necessary to move the head 30 to the flushing area A and to discharge the liquid, and thus the printing speed can be further increased. Further, since the liquid is not discharged, it is possible to suppress the amount of the consumed liquid.

Note that the controller 20 may change the first threshold value and the second threshold value, depending on the modes. For example, it is possible to make the respective threshold values in the print image quality-priority mode to be shorter (or smaller) than in a mode different therefrom. As a result, in the print image quality-priority mode, it is possible to further suppress the viscosity of the liquid in the nozzles 31 to be low, thus to suppress the occurrence of the unsatisfactory ejection due to the increase in the viscosity of the liquid, and to suppress any decrease in the image quality. On the other hand, in the print efficiency-priority mode, it is possible to reduce the number of time(s) of the discharge flushing driving, and to reduce the amount of discharged liquid and to shorten the printing time.

<Seventh Modification>

A liquid ejecting apparatus 10 according to a seventh modification further includes a maintenance unit 18 configured to perform maintenance for the head 30. The controller 20 performs the printing processing based on print data obtained for each pass; in a case that the second count value is not less than the second threshold value when the head 30 is located at a position closer to the maintenance unit 18 than to the receiving part 17, the controller 20 moves the head 30 to the receiving part 17, without executing the printing processing, and executes the discharge flushing driving in the second flushing processing.

Figures 4A, 4B, 4C, 4D, 4E, 4F:
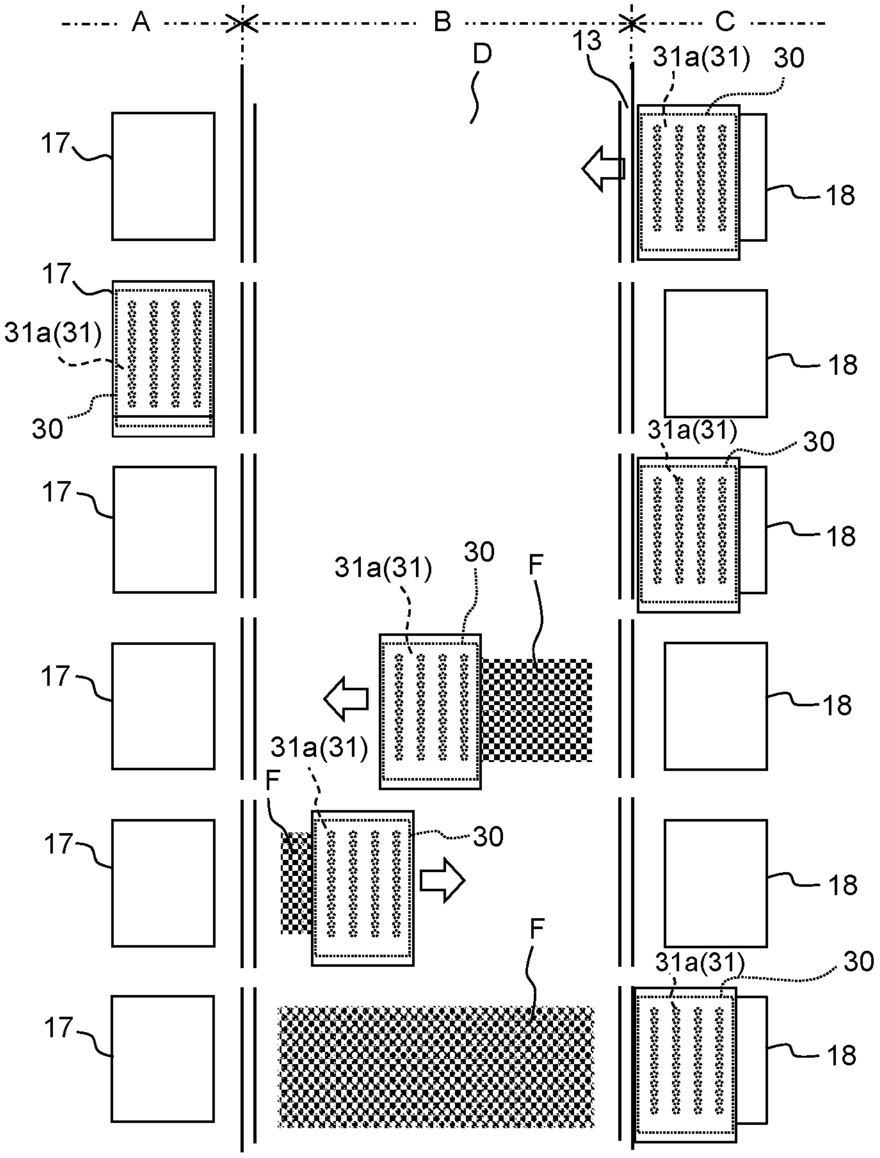
FIGS. 4A, 4B, 4C, 4D, 4E, and 4F are views for explaining a printing method by a liquid ejecting apparatus related to a seventh modification of the present disclosure.

Specifically, the maintenance unit 18 is, for example, a cap which covers the ejection surface, and is arranged in the maintenance area C. For example, the head 30 ejects the liquid while moving from the flushing area A to the maintenance area C toward the going route side, thereby executing the printing processing. After the execution of this printing processing, the head 30 is positioned in the maintenance area C, as depicted in FIG. 4A; in this situation the controller 20 receives printing information of a next pass. There is, however, such a case that the controller 20 is not capable of receiving the printing information due to, for example, any unsatisfactory communication, etc., and that the second count value becomes to be not less than the second threshold value.

In such a case, the controller 20 then interrupts the printing processing and moves the head 30 from the maintenance area C to the flushing area A toward the returning route side. Further, as depicted in FIG. 4B, the controller 20 arranges the head 30 above the receiving part 17 in the flushing area A, and executes the discharge flushing driving of the second flushing processing.

Further, in a case that the controller 20 receives printing information of a next pass, the controller 20 moves the head 30 to the maintenance area C toward the going route side, as depicted in FIG. 4C. Then, as depicted in FIG. 4D, the controller 20 causes the liquid to be ejected based on the received pass information, while moving the head 30 from the maintenance area C to the flushing area A toward the returning route side, thereby executing the printing processing. As a result, an image F is formed on the recording medium D.

In this manner, after the discharge flushing driving of the second flushing processing, the printing processing of the next pass is executed. With this, since the next pass is not subjected to the printing in a state that the viscosity of the liquid in the nozzles 31 is increased, it is possible to suppress the decrease in the image quality.

Note that, in the foregoing description, as depicted in FIGS. 4C and 4D, after the controller 20 returns the head 30 to the maintenance area C, the controller 20 forms a next pass image (an image of the next pass) while moving the head 30, in the next pass, in the original direction (toward the returning route side). However, a method of forming the next pass image is not limited to this.

For example, in a case that the second count value is not less than the second threshold value when the head 30 is located at a position closer to the maintenance unit 18 than to the receiving part 17, and the controller 20 executes the discharge flushing driving, it is allowable that the controller 20 restarts the printing processing based on remaining print data which remains without being executed (based on the print data for a latest pass remained due to an interruption of the printing processing for the latest pass), while moving the head 30 from the receiving part 17 to the maintenance unit 18. That is, the controller 20 restarts, after the discharge flushing driving, the printing processing based on the print data for a latest pass remained due to an interruption of the printing processing for the latest pass, while moving the head from the receiver to the maintenance unit.

With this, after the controller 20 executes the discharge flushing driving in FIG. 4B, the controller 20 causes the liquid to be ejected to thereby execute the printing processing based on the received information regarding the next pass while moving the head 30 from the flushing area A to the maintenance area C toward the going route side, as depicted in FIG. 4E. With this, as depicted in FIG. 4F, an image F, which is to be originally printed while the head 30 is being moved toward the returning route side, is subjected to the printing while the head 30 is being moved toward the going route side. In such a manner, since the head 30 is not returned to the maintenance area C as depicted in FIGS. 4B and 4C, a time required for returning the head 30 to the maintenance area C can be omitted, thereby making it possible to increase the print efficiency.

Note that in the above-described configuration, the determination as to whether or not the second count value is not less than the second threshold value is executed in a case that the head 30 is positioned in the maintenance area C. In contrast to this, it is also allowable to execute the determination as to whether or not the second count value is not less than the second threshold value in a case that the head 30 is located at the position closer to the maintenance unit 18 than to the receiving part 17.

For example, the controller 20 successively obtains print data and performs the determination. Accordingly, in a case that the reception of the print data is stagnated in a state that the head is in the print area B, and the second count value reaches the second threshold value, the controller 20 moves the head 30 to the receiving part 17, and executes the discharge flushing driving. Then, in a case that the controller 20 moves the head 30 from the receiving part 17 toward the going route side, the controller 20 executes the printing processing, based on print data (print process data) which remains without being executed after interruption of the printing, while moving the head 30 from the receiving part 17 toward the going route side.

Note that all the above-described embodiment and modifications may be combined with each other, provided that the embodiment and modifications are not mutually exclusive. For example, the third modification may be applied to the second modification, the fourth modification may be applied to the first to third modifications, the fifth modification may be applied to the first to fourth modifications, the sixth modification may be applied to the first to fifth modifications, and the seventh modification may be applied to the first to sixth modifications.

Further, many improvements and/or another embodiment of present disclosure will be apparent, from the foregoing explanation, to those skilled in the art. Accordingly, the foregoing explanation should be construed as illustrative only, and is provided for the purpose of teaching those skilled in the art the best mode for carrying out present invention. The details of the configuration and/or function of the present disclosure may be substantially changed, without departing from the spirit of the present invention.

The liquid ejecting apparatus and the controlling method for the same are useful as a liquid ejecting apparatus and a controlling method for the same, etc., each of which is capable of realizing high-speed printing while suppressing any unsatisfactory ejection due to the increase in the viscosity of the liquid.

What is claimed is:

1. A liquid ejecting apparatus comprising:

a head having a nozzle configured to eject a liquid;

a carriage configured to move reciprocally the head in a scanning direction;

a receiver configured to receive the liquid discharged from the head in a flushing area; and a controller;

wherein the controller is configured to execute:

a first flushing processing including a discharge flushing driving of driving the head so as to cause the head to discharge the liquid to the receiver and a non-discharge flushing driving of driving the head so as to vibrate the liquid without discharging the liquid;

a second flushing processing including the discharge flushing driving of driving the head so as to cause the head to discharge the liquid to the receiver and/or the non-discharge flushing driving of driving the head so as to vibrate the liquid without discharging the liquid; and a first printing processing of driving the carriage and the head based on a print data such that the liquid is ejected in a printing area as the head is moved in the scanning direction;

the first flushing processing is executed in a case that a first count value is not less than a first threshold value, the first count value being an elapsed time since a completion of the first flushing processing; and the second flushing processing is executed in a case that a second count value is not less than a second threshold value, the second count value being an elapsed time since a completion of the first printing processing;

wherein the controller is configured to:

reset the first count value and the second count value, in a case that the first count value, which is the elapsed time since the completion of the first flushing processing, is not less than the first threshold value, and that the first flushing processing has been executed;

determine whether a second printing processing has been started or not, the second printing processing succeeding the first printing processing;

determine whether the second count value, which is the elapsed time since the completion of the first printing processing is not less than the second threshold value or not;

reset the second count value without resetting the first count value, in a case that the second count value, which is the elapsed time since the completion of the first printing processing, is not less than the second threshold value, and that the second flushing processing has been executed;

determine whether a mode is a first mode of prioritizing a print image quality over a print efficiency or a second mode of prioritizing the print efficiency over the print image quality based on a command included in the print data;

execute the discharge flushing driving and the non-discharge flushing driving in each of the first flushing processing and the second flushing processing in the first mode of prioritizing the print image quality over the print efficiency; and execute the non-discharge flushing driving without executing the discharge flushing driving in the second flushing processing in the second mode of prioritizing the print efficiency over the print image quality, and a printing speed in the second mode is faster than a printing speed in the first mode.

2. The liquid ejecting apparatus according to claim 1, wherein in a case that the first count value reaches the first threshold value, the controller is configured to execute the non-discharge flushing driving in the first flushing processing.

3. The liquid ejecting apparatus according to claim 1, wherein the first threshold value is 60 seconds, and wherein the second threshold value is 6 seconds.

4. The liquid ejecting apparatus according to claim 1, wherein the first threshold value is greater than the second threshold value.

5. The liquid ejecting apparatus according to claim 1, wherein, in a case that the controller resets the second count value without resetting the first count value, at least one of an amount of the liquid to be discharged in the discharge flushing driving and a number of times of the discharging of the liquid to be performed in the discharge flushing driving is greater in the second flushing processing than in the first flushing processing.

6. The liquid ejecting apparatus according to claim 1, wherein, in a case that the second count value reaches the second threshold value, the controller is configured to execute the non-discharge flushing driving in the second flushing processing.

7. The liquid ejecting apparatus according to claim 1, further comprising a maintenance unit configured to perform a maintenance for the head;

the controller is configured to:

execute the first printing processing based on the print data obtained for each pass;

determine whether the head is located at a position closer to the maintenance unit than to the receiver or not; and move the head to the receiver without executing the first printing processing and execute the second flushing processing, in a case that the second count value is not less than the second threshold value as the head is located at the position closer to the maintenance unit than to the receiver.

8. The liquid ejecting apparatus according to claim 7, wherein, the controller is configured to restart, after the discharge flushing driving having been executed in a case that the second count value is not less than the second threshold value as the head is located at the position closer to the maintenance unit than to the receiver, the first printing processing based on the print data for a latest pass remained due to an interruption of the first printing processing for the latest pass, while moving the head from the receiver to the maintenance unit.

9. A method of controlling a liquid ejecting apparatus, the liquid ejecting apparatus including:

a head having a nozzle configured to eject a liquid;

a carriage configured to move reciprocally the head in a scanning direction;

a receiver configured to receive the liquid discharged from the head in a flushing area; and a controller configured to execute:

a first flushing processing including a discharge flushing driving of driving the head so as to cause the head to discharge the liquid to the receiver and a non-discharge flushing driving of driving the head so as to vibrate the liquid without discharging the liquid;

a second flushing processing including the discharge flushing driving of driving the head so as to cause the head to discharge the liquid to the receiver and/or the non-discharge flushing driving of driving the head so as to vibrate the liquid without discharging the liquid; and a first printing processing of driving the carriage and the head based on a print data such that the liquid is ejected in a printing area as the head is moved in the scanning direction;

the method comprising:

causing the controller to execute the first flushing processing in a case that a first count value is not less than a first threshold value, the first count value being an elapsed time since a completion of the first flushing processing;

causing the controller to execute the second flushing processing in a case that a second count value is not less than a second threshold value, the second count value being an elapsed time since a completion of the first printing processing;

resetting the first count value and the second count value, in a case that the first count value, which is the elapsed time since the completion of the first flushing processing, is not less than the first threshold value, and that the first flushing processing has been executed;

determining whether a second printing processing has been started or not, the second printing processing succeeding the first printing processing;

determining whether the second count value, which is the elapsed time since the completion of the first printing processing, is not less than the second threshold value or not, resetting the second count value without resetting the first count value, in a case that the second count value, which is the elapsed time since the completion of the first printing processing, is not less than the second threshold value, and that the second flushing processing has been executed;

determining whether a mode is a first mode of prioritizing a print image quality over a print efficiency or a second mode of prioritizing the print efficiency over the print image quality based on a command included in the print data;

executing the discharge flushing driving and the non-discharge flushing driving in each of the first flushing processing and the second flushing processing in the first mode of prioritizing the print image quality over the print efficiency; and executing the non-discharge flushing driving without executing the discharge flushing driving in the second flushing processing in the second mode of prioritizing the print efficiency over the print image quality, wherein a printing speed in the second mode is faster than a printing speed in the first mode.

10. The method according to claim 9, wherein the first threshold value is 60 seconds, and wherein the second threshold value is 6 seconds.

11. The liquid ejecting apparatus according to claim 1, wherein, the controller is further configured to:

determine whether the first count value, which is the elapsed time since the completion of the first flushing processing, is not less than the first threshold value or not, and wherein the controller is configured to perform the determining of whether the first count value is not less than the first threshold value or not and the determining of whether the second count value is not less than the second threshold value or not, at a timing after the completion of the first printing processing and before starting of the second printing processing.

12. The liquid ejecting apparatus according to claim 11, wherein, in a case that the first count value is not less than the first threshold value and the second count value is not less than the second threshold value, the controller is configured to execute the second flushing processing without executing the first flushing processing.

13. The method according to claim 9, further comprising:

determining whether the first count value, which is the elapsed time since the completion of the first flushing processing, is not less than the first threshold value or not, wherein the determining of whether the first count value is not less than the first threshold value or not and the determining of whether the second count value is not less than the second threshold value or not is performed at a timing after the completion of the first printing processing and before starting of the second printing processing.

* * * * *